Oct. 6, 1936.  E. R. FOSDICK  2,056,782
CONDUIT STRUCTURE BEND
Filed Aug. 22, 1934  2 Sheets-Sheet 1

INVENTOR
Ellery R. Fosdick
BY Carl H. Crawford
ATTORNEY

Oct. 6, 1936.  E. R. FOSDICK  2,056,782
CONDUIT STRUCTURE BEND
Filed Aug. 22, 1934  2 Sheets—Sheet 2
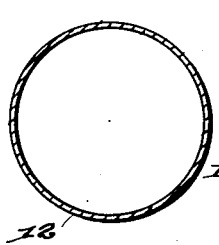
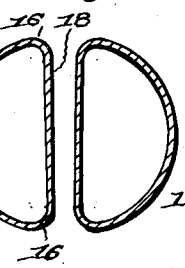
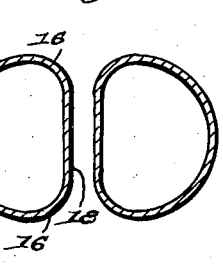
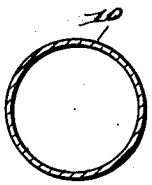
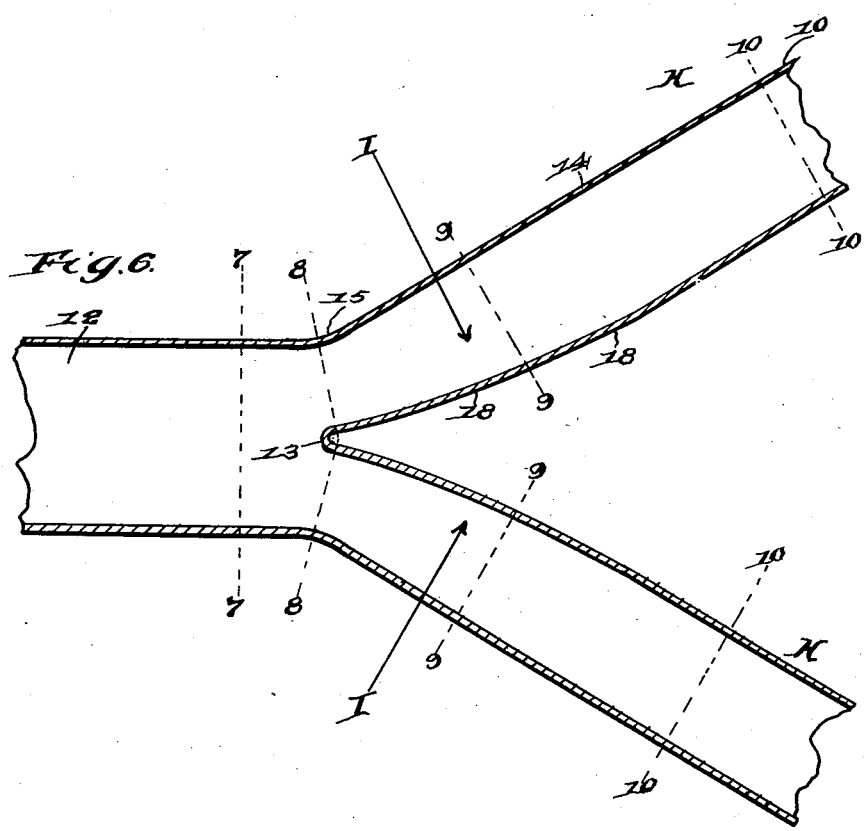
INVENTOR
Ellery R. Fosdick
BY
Carl H. Crawford
ATTORNEY Patented Oct. 6, 1936

2,056,782

UNITED STATES PATENT OFFICE 2,056,782

CONDUIT STRUCTURE BEND

Ellery R. Fosdick, Spokane, Wash., assignor of one-tenth to Carl H. Crawford, Spokane, Wash.

Application August 22, 1934, Serial No. 740,947

5 Claims. (Cl. 138—39)

This invention relates to an improved means of reducing various eddy losses in the bends or Y-portions of conduits.

In bends or Y-portions of conduits that are substantially circular in cross section, serious circumferential and longitudinal eddy losses develop because the cross section does not conform with the natural tendency of flow. It is well settled that there is a greater velocity nearest the radially outermost portion of the bend due to centrifugal action, than near the radially inner portion of the bend, but a bend of circular cross section does not permit the water to follow its natural tendency.

It is therefore a feature of this invention to provide a novel cross sectional form of bend or Y-portion that will, as nearly as possible, permit the liquid or water to follow its natural tendency of flow and thereby reduce these circumferential and longitudinal eddy losses to a minimum.

The invention involves a novel cross section of bend or Y-portion wherein the volume or velocity of flow is greater nearest the radially outer portion than it is near the radially inner portion, thereby avoiding the resistance of flow now common in Y's and bends of the conventional circular cross section.

The invention has many other features and objects which will be more fully described in connection with the accompanying drawings and which will be more particularly pointed out in and by the appended claims.

In the drawings:

Fig. 6 is a horizontal sectional view of a bifurcated conduit showing how the novel features of my invention are applied thereto.

Fig. 7 is a sectional view on line 7—7 of Fig. 6.

Fig. 8 is a sectional view on line 8—8 of Fig. 6.

Fig. 9 is a sectional view on line 9—9 of Fig. 6.

Fig. 10 is a sectional view on line 10—10 of Fig. 6.

Like characters of reference designate similar parts throughout the different figures of the drawings.

First referring to Figs. 1 to 4, the straight or normal conduit sections are indicated at 1 and are substantially cylindrical in cross section, and said sections terminate at A. What I will term transition sections, which are shown identical in form, are indicated at 2, and extend from A to B. The bend section 5, extends from B to B, and for convenience, I have shown the structure integral, as fittings have no place in the invention and can take any form desired.

Reference will next be made to the novel form of bend 5.

Figure 2:
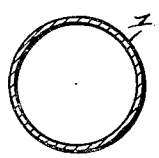
Fig. 2 is a sectional view on line 2—2 of Fig. 1, showing a normal cylindrical cross section of a part of the straight section of the conduit.
Figure 3:
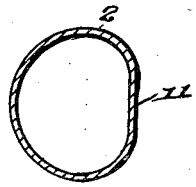
Fig. 3 is a sectional view on line 3—3 of Fig. 1, showing the shape of cross section in a transitional portion or section.
Figure 4:
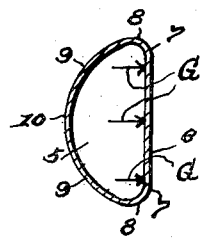
Fig. 4 is a sectional view on line 4—4 of Fig. 1, showing the cross section of the bend.

The radially outer wall 6 of the bend 5, is flat, as shown in Fig. 4, and this transversely flat portion or wall is of the same dimension from B to B. It will be understood that the wall 6 is flat transversely of the plane of the bend, as will be clear from the drawings. From the terminals 7, of said wall 6, the same is curved inwardly as at 8, where the cross section is of the greatest area. From the inwardly curved portions 8, the wall converges at 9 toward the innermost radial portion 10, the result being that this novel shape affords relatively the greatest volume or velocity of flow in the radially outermost portion of the bend. The reduction of area due to the curvature at 9 to 10, greatly reduces the volume or area of flow in the inner portion, relatively to the outer portion or area.

This novel form of cross section conforms to the natural tendency or flow by reason of the fact that centrifugal action causes a greater velocity radially outwardly in the bend than radially inwardly thereof. I therefore afford a flow in accordance with the natural tendency.

In addition to accommodating my improved bend to the natural tendency of flow, which in itself is valuable, irrespective of whether or not it took the specific shape shown, I have found that by making the outer wall transversely flat, as well as by relatively enlarging the peripheral portion of the bend, I can reduce circumferential eddy losses to a minimum. Thus this function can be more efficiently performed by combining the transversely flat wall feature with the feature of an enlarged peripheral portion.

Figure 5:
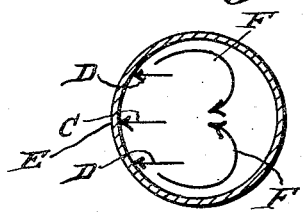
Fig. 5 is a sectional view of a cylindrical bend showing how the circumferential eddy losses are caused.

I will next explain, to the best of my knowledge and belief, and after careful engineering investigation, just why the transversely flat or cylindrical outer wall 6, minimizes circumferential eddy losses. In Fig. 5, I have shown a cylindrical bend in cross section, such as are now employed. The arrows C and D indicate the action of centrifugal force as it is imposed against the periphery of the bend, which I will designate at E. It will be clear that this force is concentrated adjacent the central arrow C and is at the maximum at that central area because that area projects radially outermost to the farthest extent and therefore the velocity of this area would be at the maximum. The centrifugal force is relatively less at the areas indicated by arrows D. Now this unequal distribution of the centrifugal force causes the liquid to eddy circumferentially of the bend, as indicated by arrows F, thereby resulting in heavy velocity losses, or in other words, head losses.

Now by reference to Fig. 4, it will be seen that the centrifugal forces, as indicated by arrows G, are imposed with equal force normal to the transversely flat or cylindrical wall 6, and this neutralizes any tendency of the water to eddy circumferentially because it presents a surface along which I can obtain an equal distribution of velocity.

It will now be clear why I combine the features of a relatively enlarged peripheral portion, and the transversely flat or cylindrical wall 6, as I obtain the maximum advantage in so doing, although with a reduced advantage it would still be within the province of my invention to employ a transversely flat or cylindrical wall of less width, and even without the feature of enlarging the peripheral porton of the bend.

I will next describe, in my own theory, why the relative reduction of the radially innermost part of the bend neutralizes and minimizes longitudinal eddy losses.

This is due to the fact that the velocity in the radially inner portion of the bend is much less than in the radially outer portion, hence by converging the walls 9 toward and to point 10, I shape the bend in a manner to conform with the natural tendency of flow, and therefore, the absence of resistance to that natural tendency, due to this shape, prevents the formation of longitudinal eddy losses. As the greater volume of flow through the bend is shifted radially outwardly by centrifugal force, as previously explained, the necessity for a correspondingly large inner area is not present. Therefore, it will be clear that the relative reduction of the inner portion of the bend is in accordance with the shifting of the flow volume outwardly. I do not mean that there is any greater or less total volume of flow, but I am emphasizing the fact that with respect to the total volume of flow, there is a shifting of its volume outwardly during its passage through the bend.

In the present construction, I have shown my improved bend in combination with straight conduit sections 1, which are cylindrical in cross section, and which terminate at A. But I do not, in this construction, connect my improved bend directly to said cylindrical sections. I interpose what I have termed transition sections which extend from A to B.

The cross section of each of these transition sections, which in this construction are shown identical in form and function, is a continually changing cross section. Near the junction of section 2 with section 1, the former is cylindrical but as it approaches section 4, the cross section gradually changes, and the transversely flat or cylindrical wall feature, as indicated at 11, in Fig. 3, appears in narrow dimension and gradually increases to the dimension of wall 6, in Fig. 4. Likewise, the cross section of the transition section gradually changes to dispose the relatively larger cross section outermost and the relatively reduced cross section relatively innermost, as the junction with the bend is made. Consequently, it will be clear that the cross section of the transition section gradually merges into the cross section of the bend and straight sections with which it unites.

In the present construction, the cross section of the transition section 2, and the cross section of the bend section 5, are each equal to the cross section of the corresponding straight conduit section 1, although in some engineering refinements, the bend section 5 may have a cross section either slightly greater or slightly less than that of the straight section 1, and therefore I do not want to be limited to the precise cross sections shown.

Figure 1:
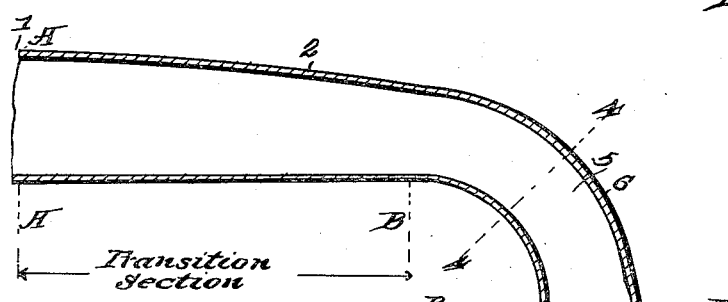
Fig. 1 is a horizontal sectional view of a conduit bend formed in accordance with the preferred type of my invention.
Figure 1:
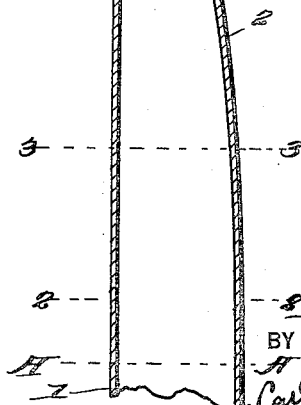

As one specific example, it will be assumed that the cylindrical section 1, in Fig. 1, has an internal diameter of twenty feet, which would afford a cross sectional flow area of three hundred and fourteen and sixteen one hundredths square feet. The transitional sections 2, and the bend section 5, would each have three hundred and fourteen and sixteen one hundredths square feet of cross sectional flow area. Thus, sections 1, 2 and 5, would have a uniform flow area, in such an installation. This would be true, irrespective of the fact that the cross sectional shape of the bend and transition sections is not cylindrical, and that the transitional sections have a gradually changing cross sectional shape while the bend section has a uniform cross sectional shape.

In this particular example, it will now be clear that from the cylindrical section 1, and through the transitional and bend sections, the flow area is uniformly the same. However, when I refer to uniform or substantially uniform areas, I do not contemplate precision accuracy because in these fabricated conduits, a variation of one half of one percent may occur, and this variation would not be functionally objectionable.

However, it will be understood that in some installations I may deliberately make a change in the cross sectional area of different sections, that is, as regards the cylindrical section 1 and the transitional sections 2, and the bend section 5, and I consider this to be within the scope of my invention as claimed, so long as I retain in sections 2 and 5 the features whereby various eddy losses are reduced. It will now be clear that while the feature of a uniform cross sectional flow area throughout all the sections is highly advantageous, it is not in all cases necessary or essential, and I may depart therefrom to meet specific conditions in unusual installations if I retain the features for reducing eddy losses.

Reference will next be made to Figs. 6 to 10, in which I have embodied the main features of this invention in a conduit having a Y or bifurcation. It will be understood that wherever I employ the term "bend" or "conduit bend" I use it generically to include the bends shown in the bifurcated form.

As shown, 12 designates the straight cylindrical section of a conduit which is bifurcated into branches both of which are identical in form and function, and hence only one need be described in detail. The same novel cross section applied to the bend, previously described, is applied to the branches which I will generally designate at H. The inner walls converge to a stream dividing bight 13, which is convexly curved toward section 12. The outer wall 14, is continuously straight from its juncture at 15, with section 12. However, as will be seen in Fig. 8, it converges from the curved junctures 16, toward and to point 17 for the same reasons and functions previously described in connection with Fig. 4, to reduce the area where the velocity is reduced. The inner wall 18, is flat transversely to the longitudinal axis of the branch, as shown in Fig. 8, for the identical reasons set forth in connection with the flat wall 6, of Fig. 4. This branch changes in cross section toward the outer end, and by reference to Fig. 9, it will be seen that the flat wall 18, at this point, is reduced in width, and finally, the cross section merges into cylindrical form at 10.

Now it will be clear that irrespective of the direction of flow through the conduit, centrifugal force will thrust the greater volume toward the flat wall 18, or in other words, in the directions indicated by the arrows I. Therefore, the same provision is made, and it will be equally effective, and fundamentally, the improvement as applied to a Y-branch, is not essentially different from what it is when applied to a conduit bend. However, in the bifurcated form, there is no need for transition sections.

It may be stated that in this form of the invention, I also perform the dual function of minimizing both longitudinal and circumferential eddy losses.

As shown, the cross section of section 12, is twice that of each branch at any longitudinal point of the latter, although in some forms, these cross sections may sometimes vary to meet special conditions.

In the method claims, I have referred to the normal section 1, as the "conduit-like passage" and to the sections 5 and 18, as the "conduit-like bend passage" to conform more nearly to an intangible definition of the method.

While I have herein shown specific forms of my invention, I do not wish to be limited thereto except for such limitations as the claims may import.

I claim:

1. As a means of reducing losses resulting from an abnormal velocity distribution of flow through a fabricated full flowing conduit bend having a continuous head for producing a continuous flow, a conduit bend section of a given cross section, and the cross section of said bend being substantially uniform throughout its length relatively enlarged radially outwardly and relatively reduced radially inwardly, within the total cross section, to afford an increased velocity radially outwardly and a decreased velocity radially inwardly to conform with the natural tendency of flow through said bend, whereby circumferential and longitudinal eddy losses of said full flowing bend may be reduced to a minimum.

2. As a means of reducing losses resulting from abnormal velocity distribution of flow through a conduit bend having a continuous head, a conduit bend section having a cross section relatively enlarged radially outwardly and relatively reduced radially inwardly to afford an increased velocity radially outwardly and a relatively reduced velocity radially inwardly to conform to the natural tendency of flow through said bend section, whereby circumferential and longitudinal eddy losses will be reduced to a minimum.

3. As a means of reducing losses resulting from abnormal velocity distribution of flow through a fabricated conduit bend, a conduit bend section of a given cross section, and the cross section of said bend being substantially uniform throughout its length and relatively enlarged outwardly and having a radially outward wall flat transversely to one plane of said section to minimize circumferential eddy losses, and the remaining inner cross sectional portion of said bend being gradually reduced radially inwardly to the radially innermost area of said bend to minimize longitudinal eddy losses.

4. As a means of reducing losses resulting from an abnormal velocity distribution of flow through a conduit bend, a straight conduit section of a given normal cross section, a conduit bend section substantially equal in cross section to that of said straight section, and the cross section of said bend being relatively enlarged radially outwardly and relatively reduced radially inwardly, to afford an increased velocity radially outwardly and a decreased velocity radially inwardly to conform with the natural tendency of flow through said bend, whereby circumferential and longitudinal eddy losses will be reduced to a minimum, and a transition conduit section connecting said straight section with said bend section and having a cross section gradually merging into the cross sections of said straight and bend sections.

5. As a means of reducing losses resulting from an abnormal velocity distribution of flow through a conduit bend, a straight conduit section of circular cross section, a conduit bend section, and the cross section of said bend being relatively enlarged radially outwardly and relatively reduced radially inwardly to conform to the natural tendency of flow through said bend and reduce circumferential and longitudinal eddy losses to a minimum, and a transition conduit section connecting said straight section with said bend section and having a cross section gradually merging into the cross sections of said straight and bend sections.

ELLERY R. FOSDICK.